Feb. 2, 1960 A. I. ANDERSON 2,923,560
ADJUSTABLE KINGPIN FOR UPPER ROCKING FIFTH WHEEL
Filed March 24, 1958

INVENTOR.
Arthur I. Anderson
BY
ATTORNEY.

United States Patent Office 2,923,560
Patented Feb. 2, 1960

2,923,560

ADJUSTABLE KINGPIN FOR UPPER ROCKING FIFTH WHEEL

Arthur I. Anderson, St. Paul, Minn., assignor to Butler Manufacturing Company, Kansas City, Mo., a corporation of Missouri Application March 24, 1958, Serial No. 723,466

5 Claims. (Cl. 280—407)

This invention relates to kingpin constructions for upper rocking fifth wheels employed on truck trailer tanks and the like and refers more particularly to a kingpin construction which is adjusted and adjustable longitudinally of the fifth wheel to permit limited adjustment of the weight distribution of the trailer on the prime mover tractor.

Previously, means have been provided of various sorts for permitting longitudinal weight adjustment between tractors and trailers of various sorts which employ a fifth wheel connection between the trailer and tractor. Such adjustment is needed to assist in accomplishing the suitable and legal distribution between the trailer and tractor. To date, however, the conventional means of providing such adjustment have contemplated either the movement of the entire upper rocking fifth wheel construction on the trailer or the longitudinal movement and adjustment of the entire kingpin receiver on the tractor. Such conventional constructions and devices have a number of disadvantages which have precluded their acceptance in the industry. In the first place, such arrangements are generally complicated and have several movable and interengaging parts with resultant costliness. In the second place, the provision of such adjustability has generally operated to weaken the desired high strength connection between the trailer and the tractor as well as the connection of the fifth wheel elements to the tractor and trailer. Generally, as well, the desired longitudinally adjustment is relatively small so as not to justify the movement of the relatively massive fifth wheel parts. Finally, the conventional longitudinal adjustment means for either trailer or tractor have been unduly space consuming on both the trailer and tractor.

Therefore, an object of the invention is to provide a kingpin construction in an upper rocking fifth wheel which is adjustable longitudinally thereof.

Another object of the invention is to provide an adjustable kingpin in an upper rocking fifth wheel construction which is both ruggedly and strongly received therein, is longitudinally adjustable therein to a plurality of positions relative thereto and wherein the mounting and adjustability of the kingpin do not affect the operation and motion of the upper rocking fifth wheel relative the trailer in any way.

Still another object of the invention is to provide a longitudinally adjustable kingpin in an upper rocking fifth wheel wherein the means permitting longitudinal adjustment of the kingpin also permit easy removal thereof, if desired, from the upper rocking fifth wheel for replacement or repair.

Another object of the invention is to provide an adjustable kingpin in an upper rocking fifth wheel wherein no change is required in the general overall form, shape or construction of the conventional upper rocking fifth wheel to insert the adjustable kingpin construction.

Another object of the invention is to provide an upper rocking fifth wheel construction having both a longitudinally adjustable kingpin and means for damping the pivotal movement of the upper rocking fifth wheel relative the trailer, if desired.

Still another object of the invention is to provide means in an upper rocking fifth wheel construction which permits swift and easy adjustment of the suitable and legal weight distribution between the tractor and trailer.

Yet another object of the invention is to provide means for adjusting the weight distribution between the tractor and trailer which neither complicates nor weakens the conventional fifth wheel construction cooperating between the tractor and the trailer.

Other objects of the invention will appear in the course of the following description thereof.

In the drawings, which form a part of the instant invention and are to be read in conjunction therewith, an embodiment of the invention is shown and, in the various views, like numerals are employed to indicate like parts.

Figure 1:
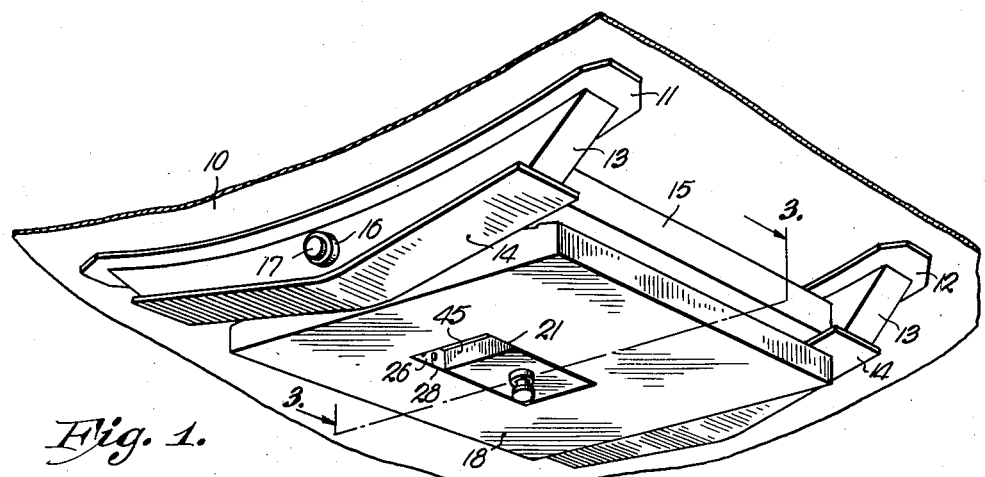
Fig. 1 is a perspective view from the underside of a portion of a tank trailer showing the upper rocking fifth wheel construction embodying the invention mounted thereon.

Referring to the drawings, at 10 is shown the curved lower surface of a truck tank trailer. Base plates 11 and 12 are welded or otherwise fixedly attached to the undersurface 10. Bolsters are mounted on said base plates 11 and 12 and comprise webs 13 and plates 14. Angle irons 15, preferably C-shaped in cross section (Fig. 3), are welded at their ends to the central surfaces of the webs 13 and extend therebetween with the open side of the C's facing inwardly. Rocker hubs 16, only one of which may be seen in Fig. 1, extend through the webs 13 and receive shaft 17 therein.

Figure 2:
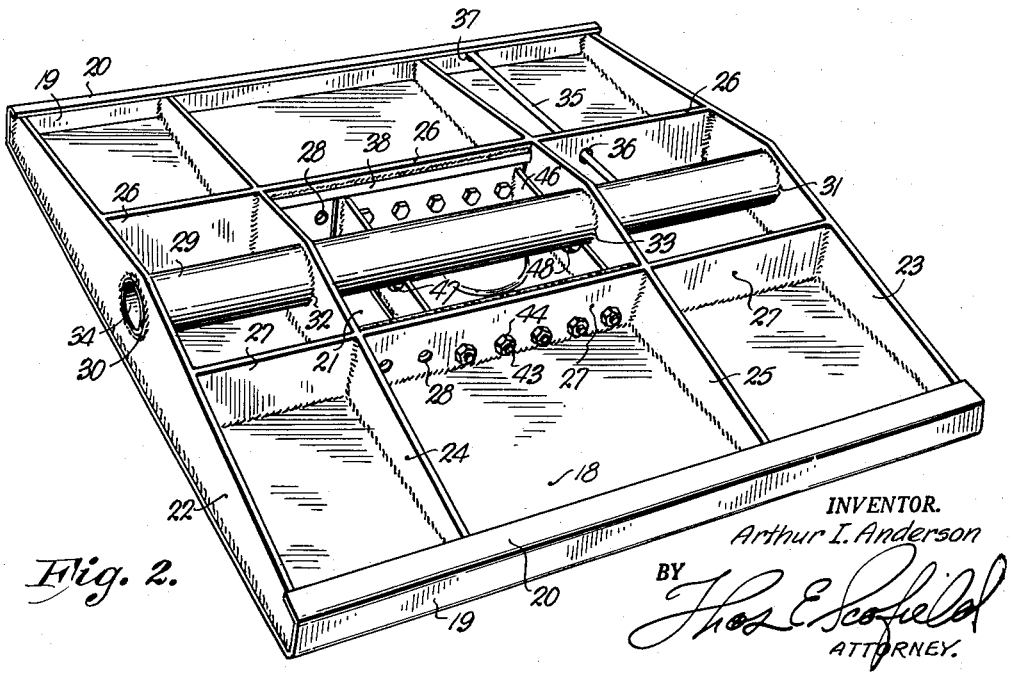
Fig. 2 is a perspective view of the upper side of the fifth wheel of Fig. 1 showing the inventive longitudinally adjustable kingpin carrier mounted therein.

Fig. 2 shows the upper rocking fifth wheel construction in a perspective view from above. Bearing plate 18 has its lateral longitudinal edges turned upwardly and over to form side and top flanges 19 and 20, respectively. Opening 21 is formed centrally of the bearing plate 18 and is preferably rectangular in shape. Cross beams 22 and 23 are received at the forward and rear ends of the bearing plate, while cross beams 24 and 25 extend transversely of the bearing plate at the front and rear edges of the opening 21. Cross beams 22—25 are welded to the bearing plate and flanges 19 and 20. Web bars 26 and 27 extend longitudinally of the bearing plate and are welded thereto and to the cross beams. Either the cross beams 24 and 25 may be continuous or the web bars 26 and 27. The web bars 26 and 27 and cross beams 24 and 25 form the walls of a recess surrounding the opening 21. Bolt holes 28 are formed in and extend through the web bars 26 and 27 in said recess. Shaft tube 29 extends through openings 30 and 31 in cross beams 22 and 23 and 32 and 33 in cross beams 24 and 25. The tube 29 is welded to all of the cross beams as shown. A bushing 34 is fixed within and extends the length of the shaft tube 30.

A grease fitting 35 extends into the shaft tube 30 and bushing 34 and passes outboard of the bearing plate through openings 36 in web bar 26 and 37 in vertical flange 19. Shear bars 38 and 39 are welded to the web bars 26 and 27 within the recess.

The kingpin carrier comprises a plate 40 which is C-shaped in cross section with upwardly extending arms 41. A plurality of bolt holes 42 are formed in the upwardly extending arms spaced equidistant along said arms. The length of the arms 41 and the number of bolt holes therein is less than the length of the web bars 26 and 27 forming the recess and the number of bolt holes received therein. The bolt holes in the arm 21 register with the bolt holes in the web bars 26 and 27. The depth of the arms 41 is substantially equal to the distance from the underside of the shear bars 38 and 39 to the surface of the bearing plate 18. Bolts 43 engaged by nuts 44 may fit the holes 42 and 28 to fix the kingpin carrier plate in the recess. End plates 45 and 46 are welded within the kingpin carrier plate and have cutout openings 47 and 48 therein to prevent contact with the tube 29. Conventional kingpin 49 is welded or otherwise fixedly attached within opening 50 in the undersurface of the carrier plate 40.

Figure 3:
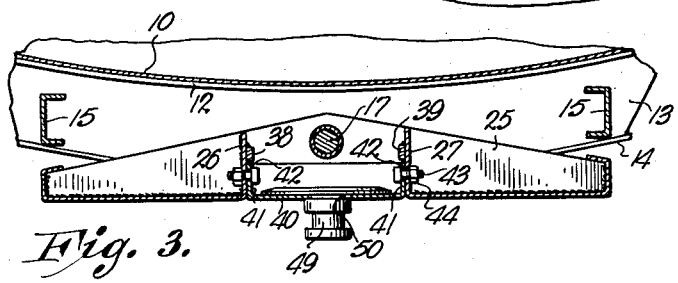
Fig. 3 is a view taken along the lines 3—3 of Fig. 1 in the direction of the arrows.
Figure 4:
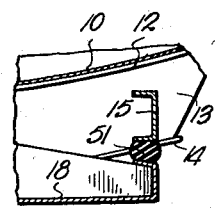
Fig. 4 is a fragmentary view corresponding to the right-hand side of Fig. 3 showing damping means for the fifth wheel positioned in the upper rocking fifth wheel construction.

Fig. 4 illustrates a strip of resilient material 51 such as rubber wedged between the flanges 20 and the underarm of the C-irons 15 to limit the rocking of the upper rocking fifth wheel around shaft 17. Ordinarily, the upper rocking fifth wheel construction is free to pivot around shaft 17 between contacts with the lower flange of the C-arms 15 as may be seen in Fig. 3 and Fig. 1.

In operation, when the upper rocking fifth wheel is mounted as in Figs. 1 and 3, and it is desired to adjust the kingpin carrier longitudinally of the bearing plate, the pins (not shown) which lock the shaft 17 relative the bolster webs 13 are knocked out and the shaft 17 may be slid longitudinally out of the rocker hubs and the tube 29. With the bearing plate assembly or upper rocking fifth wheel assembly free as in Fig. 2, the bolts 43 may be removed from the holes 42 and 28 and the kingpin carrier plate 40 slid longitudinally to register with the desired bolt holes. The bolts may then be reinserted in the holes 28 and 42 and fixed therein by nuts 44. The bearing plate or upper rocking fifth wheel assembly may then be replaced relative the bolsters and the shaft 17 slid into the rocker hubs 16 and tube 29 to once again fix the upper rocking fifth wheel assembly in its pivotable relationship with the C-irons 15. Thus it is seen that longitudinal adjustment of the position of the kingpin relative the trailer may be achieved without changing the relationship of the bolsters to the trailer or the upper rocking fifth wheel relative the bolsters. However, if greater longitudinal adjustment of pin 49 is desired, plate 18 may be reversed between the fixed bolsters 14 by removing and then reinserting shaft 17. As may be seen in Fig. 2, opening 21 is asymmetrically placed in plate 18.

From the foregoing it will be ceen that the invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all material hereinabove set forth or shown in the accompanying drawings is to be interpreted as illustrative and not in a limiting sense.

Having thus described my invention, I claim:

1. In an upper rocking fifth wheel construction supported for movement about an axis parallel to the longitudinal axis of a truck trailer, a recess in the underside of said upper rocking fifth wheel construction, a kingpin carrier within said recess, the kingpin carrier comprising a channel member substantially U-shaped in cross section, the legs of said channel fitting within the recess, a kingpin fixed to said carrier and extending downwardly therefrom, and means for adjusting the kingpin carrier longitudinally of said recess.

2. Apparatus as in claim 1 wherein the recess in the fifth wheel construction has longitudinal walls and means for adjusting the kingpin carrier cooperates between the recess longitudinal walls and the channel legs.

3. Apparatus as in claim 1 wherein the recess in the fifth wheel construction has longitudinal walls and the means for adjusting the kingpin carrier cooperates between the recess longitudinal walls and the channel legs and the means for adjusting the kingpin carrier comprises a plurality of registering bolt holes in the legs of the channel and the recess longitudinal walls and bolts engageable therewith.

4. In an upper rocking fifth wheel construction supported for movement about an axis parallel to the longitudinal axis of a truck trailer, a recess in the underside of said upper rocking fifth wheel construction, a kingpin carrier within said recess, a kingpin fixed to said carrier and extending downwardly therefrom, and means for adjusting the kingpin carrier longitudinally of said recess in increments substantially less than the length of said carrier, said means comprising a plurality of registering bolt holes in the carrier and the recess walls and bolts engageable therewith.

5. In an upper rocking fifth wheel construction supported for movement about an axis parallel to the longitudinal axis of a truck trailer, a recess in the underside of said upper rocking fifth wheel construction, a kingpin carrier within said recess, the recess of substantially greater length longitudinally of the upper rocking fifth wheel than the carrier, a kingpin fixed to said carrier and extending downwardly therefrom, and means for adjusting the kingpin carrier longitudinally of said recess in increments substantially less than the length of said carrier, said means cooperating between the recess walls and the portion of the carrier in the recess.

References Cited in the file of this patent

UNITED STATES PATENTS

| | | |
|---|---|---|
| 1,866,055 | Reid | July 5, 1932 |
| 2,144,243 | Fraser et al. | Jan. 17, 1939 |
| 2,223,571 | Meyer | Dec. 3, 1940 |
| 2,330,897 | Kirksey | Oct. 5, 1943 |
| 2,776,846 | Willock | Jan. 8, 1957 |
| 2,838,324 | Dalton | June 10, 1958 |